(12) United States Patent
Kim et al.

(10) Patent No.: US 9,692,614 B2
(45) Date of Patent: Jun. 27, 2017

(54) METHOD AND APPARATUS FOR PROVIDING TIME SYNCHRONIZATION IN IN-VEHICLE ETHERNET COMMUNICATION NETWORK

(71) Applicants: HYUNDAI MOTOR COMPANY, Seoul (KR); KIA MOTORS CORPORATION, Seoul (KR); IUCF-HYU (INDUSTRY-UNIVERSITY COOPERATION FOUNDATION HANYANG UNIVERSITY), Seoul (KR)

(72) Inventors: Seung Su Kim, Seoul (KR); Seong Jin Park, Daejeon (KR); Woo Sub Kim, Namyangju-si (KR); Ho Yoo, Suwon-si (KR); Chung Hi Lee, Seoul (KR); Sung Kwon Park, Seoul (KR); Ju Ho Lee, Seoul (KR); Young Hwan Jeon, Yongin-si (KR)

(73) Assignees: HYUNDAI MOTOR COMPANY, Seoul (KR); KIA MOTORS CORPORATION, Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 99 days.

(21) Appl. No.: 14/705,827

(22) Filed: May 6, 2015

(65) Prior Publication Data
US 2016/0149692 A1    May 26, 2016

(30) Foreign Application Priority Data
Nov. 26, 2014 (KR) ........................ 10-2014-0166493

(51) Int. Cl.
H04L 12/46 (2006.01)
H04J 3/06 (2006.01)

(52) U.S. Cl.
CPC ........ *H04L 12/4625* (2013.01); *H04J 3/0641* (2013.01); *H04J 3/0667* (2013.01)

(58) Field of Classification Search
None
See application file for complete search history.

(56) References Cited

U.S. PATENT DOCUMENTS

2013/0121347 A1* 5/2013 Saito ..................... H04J 3/0697
                                                          370/474
2013/0227008 A1    8/2013 Yang
(Continued)

FOREIGN PATENT DOCUMENTS

JP    2001-244918 A    9/2001
JP    2004-312060 A    11/2004
(Continued)

OTHER PUBLICATIONS

IEEE Standard for Local and Metropolitan area networks—"Timing and Synchronization for Time-Sensitive Applications in Bridged Local Area Networks," IEEE Computer Society, Approved Feb. 10, 2011, IEEE Std 802.1AS-2011, 292 pgs.
(Continued)

*Primary Examiner* — Diane Lo
(74) *Attorney, Agent, or Firm* — McDermott Will & Emery LLP (57) ABSTRACT

A method for providing time synchronization in a node connected to an Audio Video Bridging (AVB) Ethernet communication network includes steps of receiving static announcement messages from adjacent nodes and constituting a static grandmaster table, reselecting a grandmaster with reference to the static grandmaster table when a syn-
(Continued)

chronization message timer expires, and updating the static grandmaster table according to reselection of the grandmaster. The method may rapidly time synchronization in the Audio Video Bridging (AVB) Ethernet communication network and minimize network load.

25 Claims, 9 Drawing Sheets

(56) References Cited

U.S. PATENT DOCUMENTS

| | | | | |
|---|---|---|---|---|
| 2014/0281037 | A1* | 9/2014 | Spada | H04L 69/28 709/248 |
| 2015/0134764 | A1* | 5/2015 | Noebauer | H04L 67/12 709/208 |
| 2015/0318941 | A1* | 11/2015 | Zheng | H04J 3/0697 370/503 |

FOREIGN PATENT DOCUMENTS

| | | |
|---|---|---|
| JP | 2012-074799 A | 4/2012 |
| KR | 10-1999-0056070 A | 7/1999 |
| KR | 10-2005-0063750 A | 6/2005 |
| KR | 10-2009-0071923 A | 7/2009 |
| KR | 10-1244763 B1 | 3/2013 |

OTHER PUBLICATIONS

Korean Office Action issued in Korean Application No. 10-2014-0166493 dated Sep. 1, 2015.

* cited by examiner

FIG. 1

| | Octets | | |
|---|---|---|---|
| 8 7 6 5 | 4 3 2 1 | | |
| transportSpecific | messageType | 1 | 0 |
| reserved | versionPTP | 1 | 1 |
| messageLength | | 2 | 2 |
| domainNumber | | 1 | 4 |
| reserved | | 1 | 5 |
| flags | | 2 | 6 |
| correctionField | | 8 | 8 |
| reserved | | 4 | 16 |
| sourcePortIdentity | | 10 | 20 |
| sequenceId | | 2 | 30 |
| control | | 1 | 32 |
| logMessageInterval | | 1 | 33 |

FIG. 2

| Bits | Octets | Offset |
|---|---|---|
| 8 7 6 5 4 3 2 1 | | |
| header | 34 | 0 |
| reserved | 10 | 34 |
| currentUtcOffset | 2 | 44 |
| reserved | 1 | 46 |
| grandmasterPriority1 | 1 | 47 |
| grandmasterClockQuality | 4 | 48 |
| grandmasterPriority2 | 1 | 52 |
| grandmasterIdentity | 8 | 53 |
| stepsRemoved | 2 | 61 |
| timeSource | 1 | 63 |
| path trace TLV | 4+8N | 64 |

| ITEM | DESCRIPTION |
|---|---|
| ClockIdentity | CLOCK IDENTITY OF NODE INITIALLY TRANSMITTING CORRESPONDING STATIC ANNOUNCEMENT MESSAGE |
| stepsRemoved | NUMBER OF NODES (HOPS) FROM NODE INITIALLY TRANSMITTING CORRESPONDING STATIC ANNOUNCEMENT MESSAGE TO RECEPTION TERMINAL |
| Source portIdentity | CLOCK IDENTITY OF NODE FINALLY TRANSMITTING STATIC ANNOUNCEMENT MESSAGE |
| portPriotiryNumber | PRIORITY ALLOCATED TO EACH PORT OF NODE |

METHOD AND APPARATUS FOR PROVIDING TIME SYNCHRONIZATION IN IN-VEHICLE ETHERNET COMMUNICATION NETWORK

CLAIM OF PRIORITY

This application claims the benefit of priority to Korean Patent Application No. 10-2014-0166493, filed on Nov. 26, 2014, which is hereby incorporated by reference as if fully set forth herein.

TECHNICAL FIELD

The present disclosure relates to a method and apparatus for providing time synchronization in an in-vehicle Ethernet communication network, and more particularly, to a method and apparatus for providing time synchronization in an in-vehicle Ethernet communication network in which a grandmaster may be rapidly selected using an Audio Video Bridging (AVB) Ethernet static grandmaster table.

BACKGROUND

In vehicles on the market now, various electronic control devices to improve driver convenience and safety are provided and an in-vehicle communication network for communication between these electronic control devices is basically provided.

Particularly, as the number of in-vehicle electronic controllers continuously increases and the electronic controllers can interwork with various external devices, overload of a conventional in-vehicle communication network and costs for wiring harnesses increase.

Further, according to consumer requirements for high-quality images and audio data and increase in image using applications, necessity for bandwidth extension increases.

Therefore, many vehicle manufacturers consider introduction of Ethernet as an in-vehicle communication network, and some vehicle manufacturers mass-produce an Around View Monitor (AVM) system based on Ethernet.

General Ethernet includes a plurality of Local Area Networks (LANs) and a plurality of bridges for interconnection between the LANs.

Ethernet is characterized in that a plurality of nodes competitively attempts to approach a common medium using a Carrier Sense Multiple Access/Collision Detection (CSMA/CD) protocol. However, since the same priority is given to all traffic and the nodes transmit their own traffic through competition, the CSMA/CD protocol is not suitable for transmission of multimedia data sensitive to transmission time delay, such as moving pictures and audio data.

Therefore, Ethernet uses time synchronization of all nodes on a network for transmission of multimedia data sensitive to transmission time delay.

In transmission protocol layer standards, such as IEEE 1722, an Audio Video Bridging (AVB) standard for transmission of audio or video signals sensitive to a streaming time is being developed now. In the AVB standard, transmission quality guaranteed technology to effectively transmit a multimedia stream, such as audio or video data, on Ethernet is to be developed.

As described above, the conventional LAN, particularly, representative technology thereof, i.e., Ethernet, fundamentally uses frame-based packet switching and thus has a difficulty in providing effective quality guaranteed transmission. In order to solve such a drawback, AVB named Synchronous Ethernet or Residential Ethernet in IEEE 802.2 has been first developed, and a method of implementing similar technology on bridges to the extent of not significantly affecting the paradigm of conventional nonsynchronization packet switching in IEEE 802.1 is being developed now.

Fundamentally, the AVB technology in IEEE 802.1 enables synchronous traffic transmission using conventional Ethernet bridges performing packet switching and it is important that clocks of bridges within a designated geographical range are synchronized. When clocks of the bridges are synchronized, an Ethernet frame having a regular size may be transmitted between the bridges by designated time intervals at an accurately desired time. Therefore, a bridge mesh to which such a fundamental concept is applied may be used as infrastructure for stably transmitting synchronous traffic.

For example, IEEE 1588 Precision Time Protocol (PTP) is a time synchronization standard operable throughout all Open Systems Interconnection (OSI) layers and IEEE 802.1AS is a time synchronization standard supporting the profile of only OSI layer 2, i.e., a data link layer. If IEEE 802.1AS is applied to layer 2 devices, such as bridges and switches, an OSI layer 2 time synchronization network may be configured.

In a time synchronization method between respective devices in IEEE 802.1AS, a transmission side and a reception side are synchronized using time stamps including time synchronization information and, in order to perform time synchronization, a grandmaster (GM) to provide a reference time is selected from among devices in a network, and the local time of the selected grandmaster is transmitted to other devices through an announcement message so that the devices use the local time as the reference time. Particularly, a transmission delay time between a point of transmission time of a specific message at a transmission terminal and a point of reception time of the message at a reception terminal is measured and thereby, the reference time of the reception terminal is corrected. Here, the grandmaster transmits the announcement message to all of other devices and thus transmits its own presence and a comparison value for validity as a device providing a reference time to these devices.

That is, the grandmaster is the uppermost node of an IEEE 802.1AS timing tree and periodically transmits current time information to lower nodes.

In IEEE 802.1AS, a procedure for determining a grandmaster and acquiring time synchronization, a procedure for searching all devices in a network using a plurality of control messages and controlling approach to links, a procedure for continuously confirming link states through announcement messages, and the like are defined.

However, in conventional IEEE 802.1AS, if a bridge, serving as the grandmaster, is not normally operated, a new grandmaster is set again through a Best Master Clock Algorithm (BMCA). Therefore, the amount of traffic on the Ethernet network increases and it takes a long time to reconfigure time synchronization on a system.

SUMMARY OF THE INVENTION

Accordingly, the present invention is directed to a method and apparatus for providing time synchronization in an in-vehicle Ethernet communication network that substantially obviates one or more problems due to limitations and disadvantages of the related art.

An object of the present invention is to provide a method and apparatus for providing time synchronization in an in-vehicle Ethernet communication network.

Another object of the present invention is to provide a method and apparatus for providing time synchronization in an in-vehicle Ethernet communication network in which time synchronization may be rapidly acquired using a static grandmaster table in an Audio Video Bridging (AVB) Ethernet communication network.

Another object of the present invention is to provide a method and apparatus for providing time synchronization in an in-vehicle Ethernet communication network in which a static grandmaster table may be constituted when an initial time synchronization procedure between a bridge and terminals having the same time source is performed, and a new grandmaster may be rapidly selected using the constituted static grandmaster table when the grandmaster is absent.

Yet another object of the present invention is to provide a method and apparatus for providing time synchronization in an in-vehicle Ethernet communication network in which, when a grandmaster is reselected, a time taken for traffic and time synchronization on an Ethernet network may be minimized.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for providing time synchronization in a node connected to an Audio Video Bridging (AVB) Ethernet communication network includes receiving static announcement messages from adjacent nodes and constituting a static grandmaster table, reselecting a grandmaster with reference to the static grandmaster table when a synchronization message timer expires, and updating the static grandmaster table according to reselection of the grandmaster.

In another aspect of the present invention, a computer readable recording medium having a program recorded therein to implement the method is provided.

In yet another aspect of the present invention, an apparatus for providing time synchronization in a node connected to an Audio Video Bridging (AVB) Ethernet communication network includes a unit to receive static announcement messages from adjacent nodes and to constitute a static grandmaster table, a unit to reselect a grandmaster with reference to the static grandmaster table when a synchronization message timer expires, and a unit to update the static grandmaster table according to reselection of the grandmaster.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. The suffixes "module" and "unit" in elements used in the description below are given or used together only in consideration of ease in preparation of the specification and do not have distinctive meanings or functions.

Hereinafter, although one embodiment of the present invention illustrates all elements as being combined, embodiments of the present invention are not limited thereto. That is, one or more of all the elements may be selectively combined within the scope of the invention. Further, all the elements may be respectively implemented by independent pieces of hardware, or some of the elements may be selectively combined and thus implemented by a computer program having a program module performing the functions of the combined elements in a plurality of pieces of hardware. Code and code segments constituting the computer program may be easily deduced by those skilled in the art. Such a computer program is stored in a computer readable storage medium, and read and executed by a computer, thus being capable of implementing embodiments of the present invention. Storage media of computer programs may include a magnetic recording medium, an optical recording medium, a carrier wave medium, etc.

Further, it will be understood that the terms "including", "constituting", or "having" in the description mean that a corresponding element may be included and other elements than the element may be further included. It will be understood that all terms including technical or scientific terms have the same meanings as generally understood by those skilled in the art. Generally used terms, such as terms defined in a dictionary, may be interpreted as having meanings coinciding with the meanings used in the art, and may not be interpreted as having ideal or excessively formal meanings.

Further, in description of elements of the present invention, the terms "first", "second", "A", "B", "(b)", etc. may be used. These terms are used only to discriminate one element from other elements, and the nature, order, or sequence of the corresponding element is not limited by these terms. If it is stated that an element is "connected to", "combined with", or "coupled with" another element, it will be understood that the former may be directly connected to or combined with the latter or other elements may be interposed between the two elements.

Hereinafter, with reference to FIGS. 1 to 5, a conventional time synchronization method defined in IEEE 802.1AS will be described in brief.

In IEEE 802.1AS, header structures of messages used for network time synchronization, the structure of an announcement message, a method for selecting a grandmaster providing reference time information, a method for allocating roles to respective ports in a switch and the like are defined.

Figure 1:
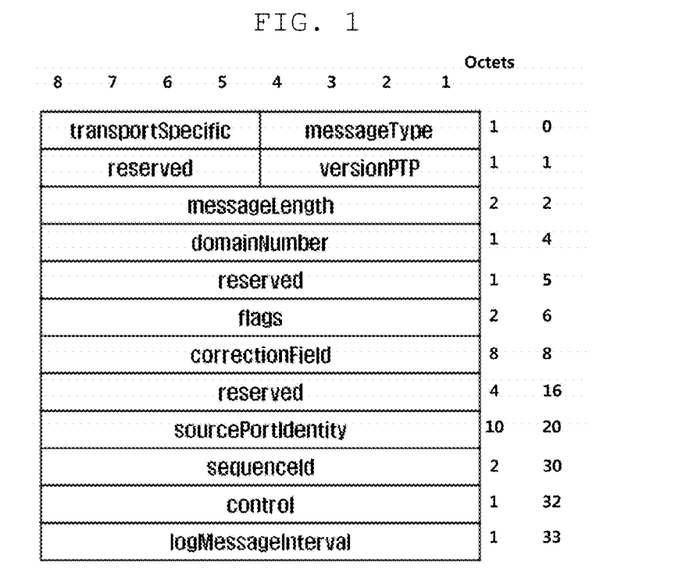
FIG. 1 is a view illustrating a conventional message header structure defined in IEEE 802.1AS.
Figure 2:
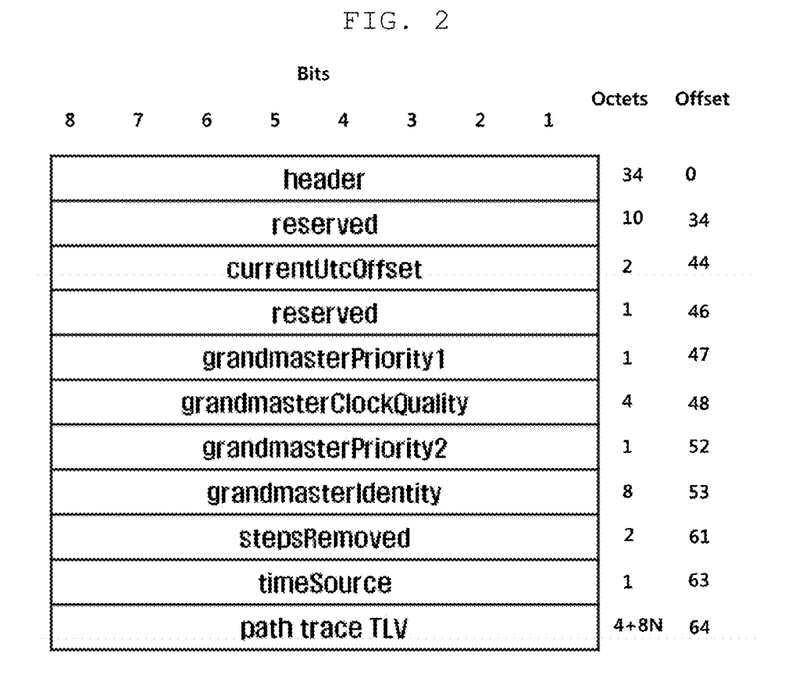
FIG. 2 is a view illustrating the structure of a conventional announcement message defined in IEEE 802.1AS.

FIG. 1 is a view illustrating a conventional message header structure defined in IEEE 802.1AS and FIG. 2 is a view illustrating the structure of a conventional announcement message defined in IEEE 802.1AS.

Figure 3:
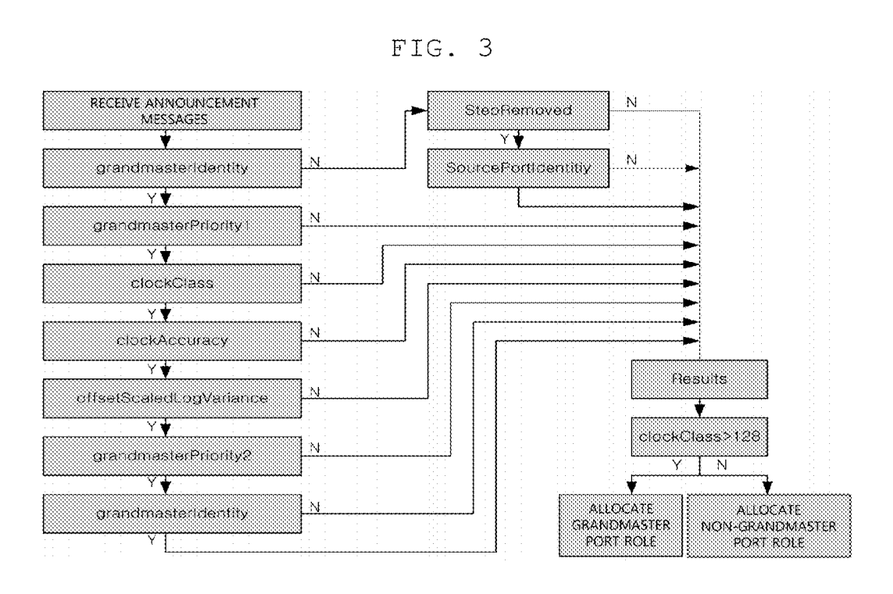
FIG. 3 is a view illustrating a conventional announcement message comparison procedure and port allocation method in IEEE 802.1AS.

The announcement message may include information necessary to select a grandmaster, such as currentUtcOffeset, grandmasterPriority1, grandmasterPriority2, grandmasterClockQuality, grandmasterIdentity and the like. Hereinafter, for convenience of description, the information necessary to select a grandmaster will be referred to as reference time information. FIG. 3 is a view illustrating a conventional announcement message comparison procedure and port allocation method in IEEE 802.1AS.

All qualified stations on a network may configure announcement messages including its own reference time information and then transmit the announcement messages to other stations. Here, a station having a clock of the highest quality may be selected as a grandmaster. That is, when each station receives announcement messages from other stations, the station may select a station having the highest priority and accuracy as a grandmaster thereof by comparing reference time information included in the received announcement messages with its own reference time information. Of course, if the reference time of such a station is more accurate than the reference times of other stations, the station may determine itself to be selected as a grandmaster.

All ports of the station selected as the grandmaster serve to transmit reference time information to other stations. Hereinafter, for convenience of description, ports of the grandmaster used to transmit the reference time information of the grandmaster will be defined as master ports. On the other hand, ports of other stations connected to the master port and used to receive the reference time information of the grandmaster will be defined as slave ports.

As exemplarily shown in FIG. 3, when each station receives announcement messages of other stations, the station may confirm priorities and accuracies between the station and the other stations by comparing reference time information of the other stations, such as values of the fields of grandmasterIdentity, grandmasterPriority1, clockclass, clockAccuracy, offsetScaledLogVariance, grandmasterPriority2, StepsRemoved, SourcePortIdentity and the like, with its own reference time information and then determine which station is selected as a grandmaster. For example, if it is determined that a station A is selected as a grandmaster, the station A allocates a master port role to all ports thereof. On the other hand, if it is determined that another station is selected as a grandmaster, the station A allocates a slave port role to a port thereof to receive a time synchronization message from the grandmaster and allocates a master port role to a port thereof to transmit its own time synchronization message to lower nodes. On the other hand, end nodes allocate a slave port role to all ports thereof.

Figure 4:
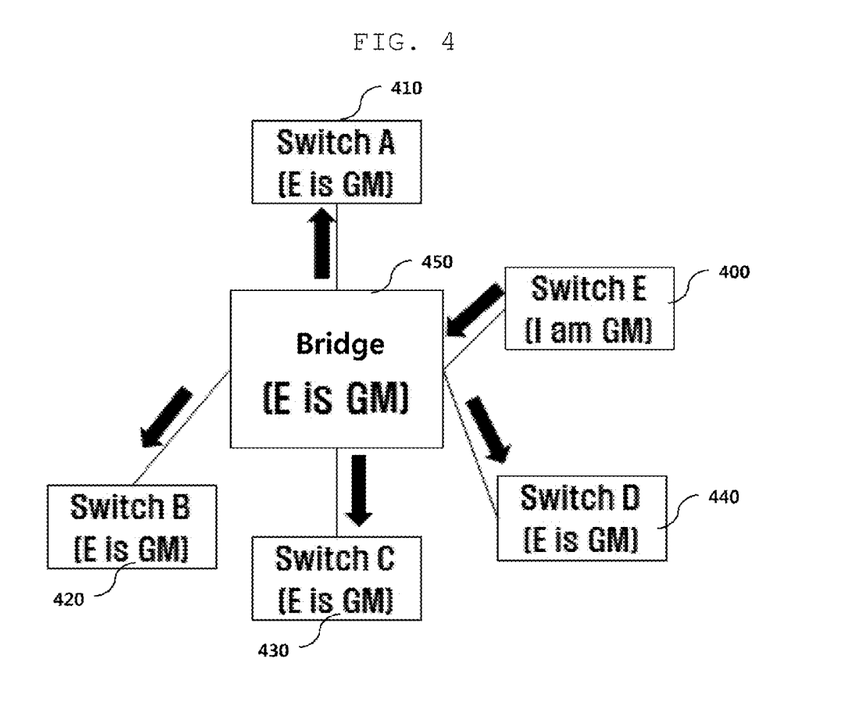
FIG. 4 is a view illustrating a conventional time synchronization procedure in IEEE 802.1AS.

FIG. 4 is a view illustrating a conventional time synchronization procedure in IEEE 802.1AS.

In more detail, FIG. 4 illustrates a time synchronization procedure in a star topology network structure using bridges.

In general, a bridge is a communication network interconnection device to interconnect two LANs and is operated in a data link layer of an OSI reference model.

Bridges may be used (1) when the range and length of a communication network are extended, (2) when a larger number of devices is connected to a communication network, (3) when a bottleneck state caused by an excessively large number of devices connected to a communication network needs to be reduced, (4) when communication networks consisting of different physical media (communication lines) are interconnected, (5) when communication network structures of different topologies, such as Ethernet and Token Ring, are interconnected, and the like.

With reference to FIG. 4, it is assumed that a switch E 400 is selected as a grandmaster through an initial time synchronization procedure. The switch E 400 may periodically generate an announcement message including its own reference time information and transmit the generated announcement message to a bridge 450. Thereafter, the bridge 450 may transmit the received announcement message to a switch A 410, a switch B 420, a switch C 430, and a switch D 440.

Particularly, the bridge 450 may identify a switch providing the most accurate time information by analyzing time information included in received announcement messages, and transmit only the announcement message received from the identified switch to slave nodes.

Figure 5:
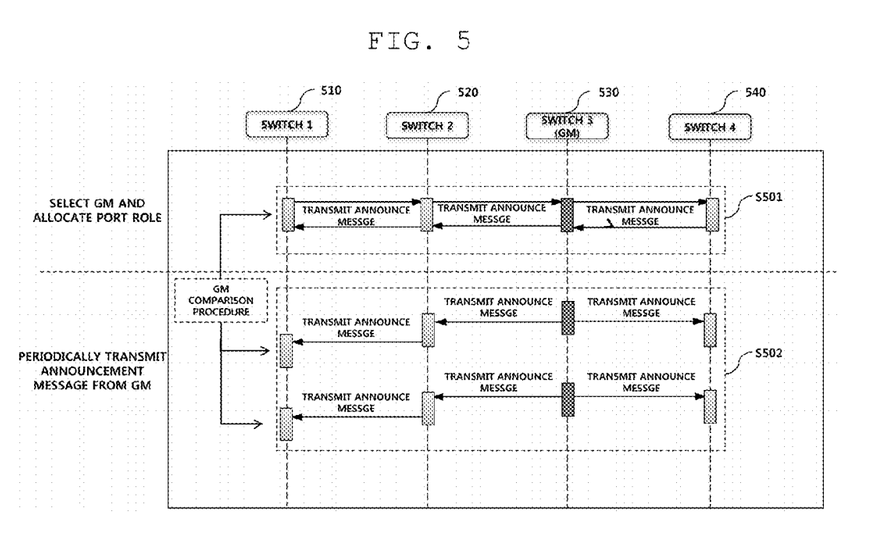
FIG. 5 is a flowchart illustrating a conventional grandmaster selection and announcement message transmission procedure.

FIG. 5 is a flowchart illustrating a conventional grandmaster selection and announcement message transmission procedure.

With reference to FIG. 5, each of a switch 1 510 to a switch 4 540 transmits its own announcement message to the switches connected thereto, selects a grandmaster through a reference time information comparison procedure on each switch, and allocates roles to its own ports according to a result of selection (Operation S501). As exemplarily shown in FIG. 5, it is assumed that the switch 3 530 is selected as a grandmaster.

Thereafter, the switch 3 530 generates an announcement message periodically, for example, at a period of 1 second, and transmits the generated announcement message to the switch 2 520 and the switch 4 540 through master ports, and the switch 2 520 transmits the received announcement message to the switch 1 510 through its own master port (Operation S502). That is, a station selected as a grandmaster may inform other stations of presence of the grandmaster and superiority of its own reference time through an announcement message.

Figure 6:
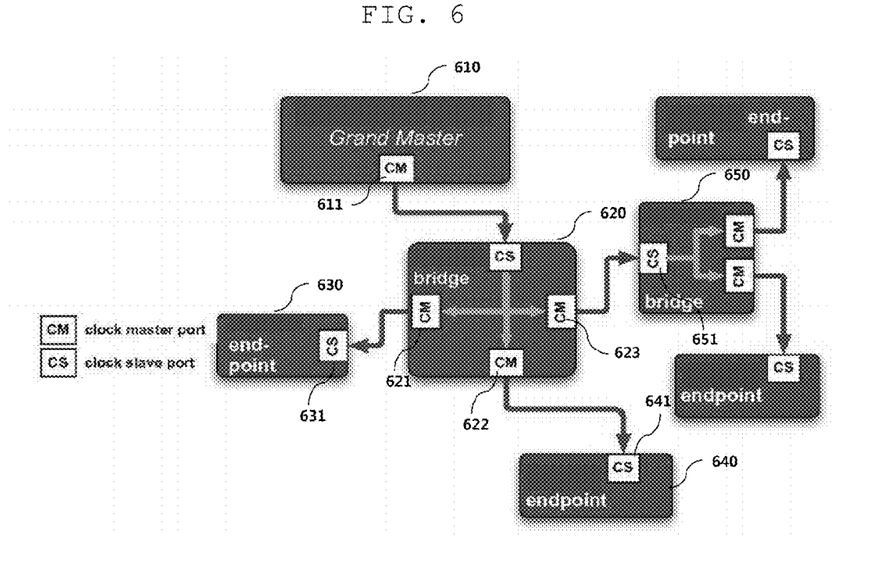
FIG. 6 is a view illustrating a time synchronization method between nodes based on IEEE 802.1AS.

FIG. 6 is a view illustrating a time synchronization method between nodes based on IEEE 802.1AS.

With reference to FIG. 6, an 801.1AS device (grandmaster; GM) 610 transmits a synchronization message (sync message) and a correction follow-up message (hereinafter, simplified as a follow-up message) to a clock slave port of another 801.1AS device (bridge) 620 through a clock master port 611.

Thereafter, the 801.1AS device (bridge) 620 transmits time correction information based on cable and bride delay through the follow-up message to clock slave ports 631, 641 and 651 of other 801.1AS devices (endpoints or bridges) 630, 640 and 650 through clock master ports 621, 622 and 623. Here, the follow-up message is a message transmitted a designated time after transmission of the synchronization message.

The time correction information may include time stamp information including link delay information and propagation time delay information, neighbor rate ratio information, and correction field information.

When each 801.1AS device receives the follow-up message, the 801.1AS device updates time stamp information, correction field information, and neighbor rate ratio information based on the received follow-up message, and transmits the follow-up message including the updated information through its own clock master ports.

Figure 7:
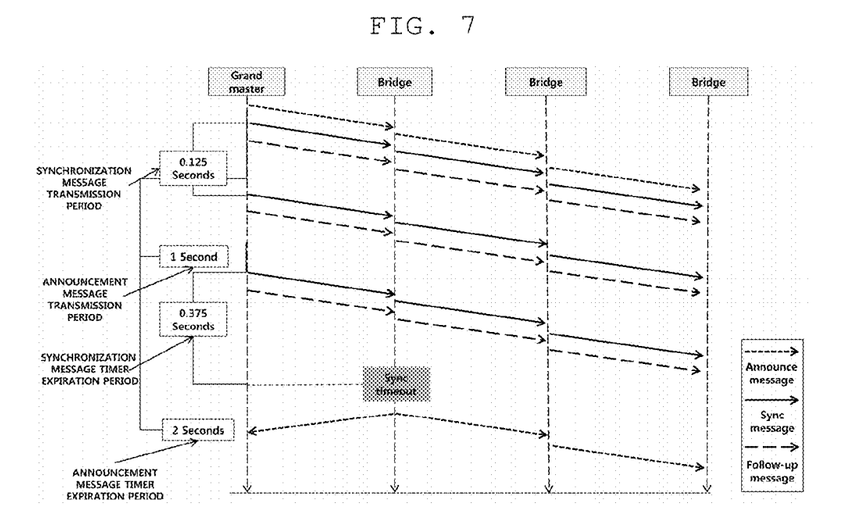
FIG. 7 is a flowchart illustrating a time synchronization procedure based on IEEE 802.1AS.

FIG. 7 is a flowchart illustrating a time synchronization procedure based on IEEE 802.1AS.

With reference to FIG. 7, when a reception bridge receives a synchronization message, a designated synchronization timer is driven and, when the bridge does not receive another synchronization message before the synchronization timer expires, it may determine that a current grandmaster is not normally operated. That is, the reception bridge may regard the grandmaster as being in an absent state and start a grandmaster reselection procedure based on a Best Master Selection Algorithm (BMSA). Here, in a BMSA procedure, all nodes on a network transmit announcement messages to adjacent nodes through their own master ports, identify a node providing the most accurate reference time, and select the identified node as a new grandmaster, as exemplarily shown in FIG. 5.

Here, a timer expiration interval of an announcement message, for example, 2 seconds (i.e., 2 announcement intervals, an announcement message interval being 1 second), is longer than a timer expiration interval of a synchronization message, for example, 0.125*3 seconds (3 synchronization intervals, a synchronization message interval being ⅛ seconds). Therefore, in order to determine whether or not the grandmaster is normally operated, the timer expiration interval of a synchronization message is applied.

Particularly, in IEEE 802.1AS, all reference time related information, such as CurrentUtcOffset, Priority1, Priority2, ClockQuality, grandmaster Identity, StepsRemoved, and the like, are compared, and the BMSA for determining roles of ports of the respective devices by comparing results of comparison and the sizes of ClockGlass values again are used.

According to the BMSA, the respective devices transmit reference time information including a plurality of message fields to all slave ports using announcement messages. Thereafter, the device receiving the announcement messages determines a device which may provide more accurate reference time as a grandmaster, by comparing reference time information extracted from the received announcement messages with its own inner time information, and allocates roles to respective ports according to a result of determination.

If a communication environment within a restricted range, such as a small-scaled network requiring time synchronization or an in-vehicle network, is configured, all devices may use a common time source, as needed.

However, conventionally, all devices may use different time sources and, if network time synchronization is performed according to absence of a grandmaster (or abnormal operation of the grandmaster) under such an environment, the respective devices perform the BMCA and compare all reference time related information and thus, a convergence time (meaning a time taken to perform a comparison procedure before transmitting an announcement message to other bridges and terminals) is elongated.

Further, conventionally, as announcement messages for reconfiguration (or reselection) of a grandmaster are transmitted from respective nodes to adjacent nodes, the amount of traffic on the network is rapidly increased.

Figure 8:
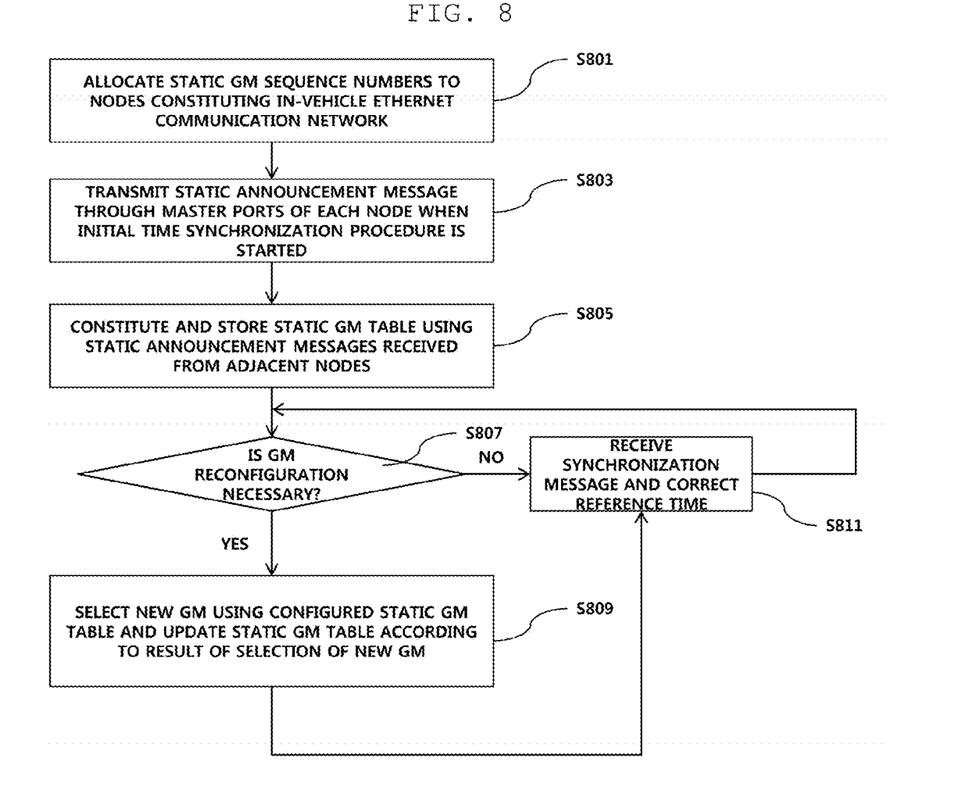
FIG. 8 is a flowchart illustrating a static grandmaster table generation procedure in accordance with one embodiment of the present invention.

FIG. 8 is a flowchart illustrating a static grandmaster table generation procedure in accordance with an embodiment of the present invention.

With reference to FIG. 8, static grandmaster sequence numbers may be allocated to respective nodes configuring an in-vehicle Ethernet communication network in advance (Operation S801).

When an initial time synchronization procedure is started, each node transmits a static announcement message including ClockIdentity including the Media Access Control (MAC) address and static grandmaster sequence information of the corresponding node through it own master ports (Operation S803).

A node having received static announcement messages selects a grandmaster by comparing the static grandmaster sequence information included in the static announcement messages with static grandmaster sequence information allocated to itself and allocates roles to its own ports and ports of adjacent nodes. Here, a result of selection of the grandmaster and information regarding allocation of roles to ports of the corresponding node and ports of the adjacent nodes may constitute a static grandmaster table and be maintained in the static grandmaster table (Operation S805).

Thereafter, whether or not grandmaster reconfiguration is necessary is determined (Operation S807). As a result of judgment, if grandmaster reconfiguration is necessary, each node may perform a new grandmaster selection procedure with reference to the constituted static grandmaster table (Operation S809).

On the other hand, if grandmaster reconfiguration is not necessary, as a result of judgment in Operation S807, each node may correct its own inner reference time using a synchronization message received through the slave port thereof (Operation S811).

Particularly, nodes constituting an in-vehicle Ethernet communication network in accordance with the present invention may use the same time source and perform a time synchronization procedure using static announcement messages including a smaller number of fields than the conventional announcement messages defined in IEEE 802.1AS, i.e., having a smaller size.

The structures of a static grandmaster table and a static announcement message applied to the present invention will be more clearly described with reference to the accompanying drawings.

Figure 9:
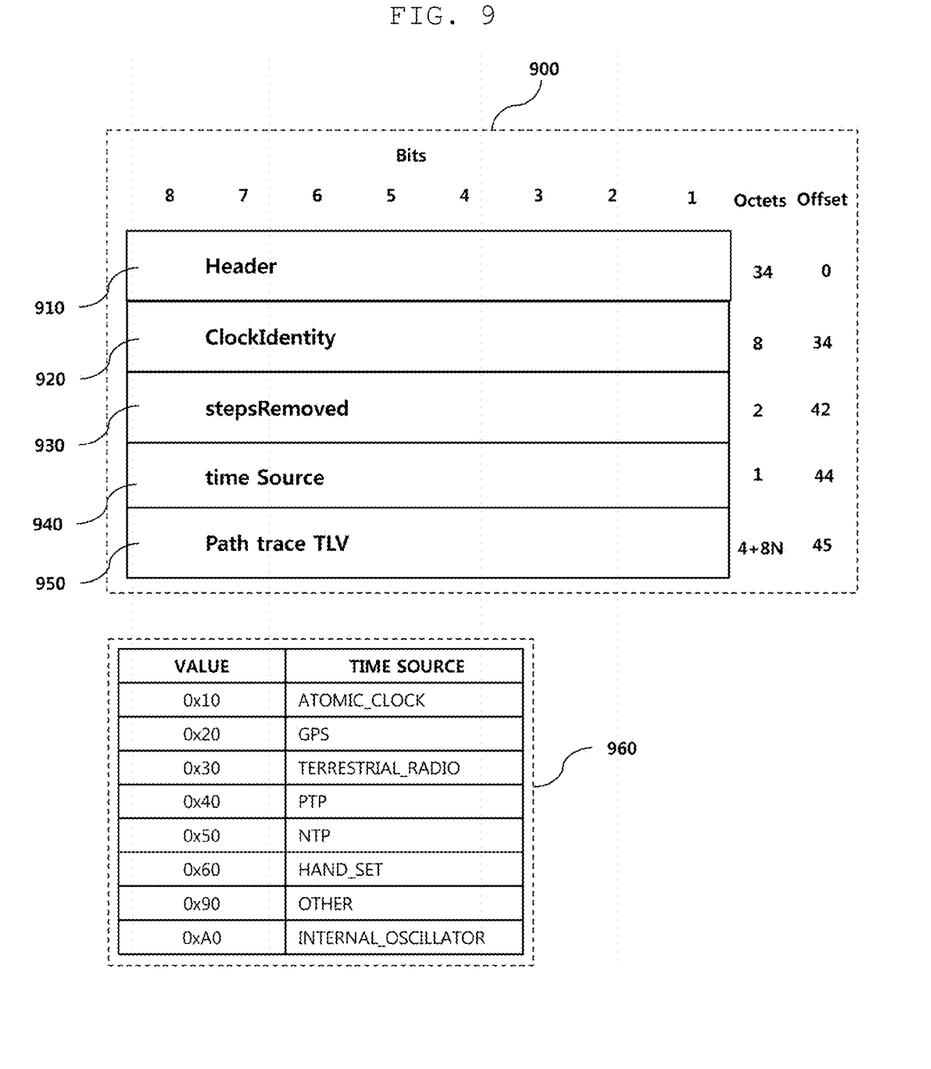
FIG. 9 is a view illustrating the structure of a static announcement message in accordance with one embodiment of the present invention.

FIG. 9 is a view illustrating the structure of a static announcement message in accordance with one embodiment of the present invention.

With reference to FIG. 9, a static announcement message 900 may include a Header field 910, a ClockIdentity field 920, a stepsRemoved field 930, a Time Source field 940, and a Path Trace TLV field 950.

The static announcement message 900 in accordance with the present invention has a size of 49+8N Bytes and does not include the fields of currentUtcOffeset, grandmasterPriority1, grandmasterClockQuality, and grandmasterPriority2, as compared the conventional announcement message defined in IEEE 802.1AS shown in FIG. 2.

Further, the static announcement message 900 includes the ClockIdentity field 920, instead of the grandmasterIdentity field of the conventional announcement message.

The Time Source field 940 in accordance with the present invention may be defined as shown by reference numeral 960.

Figure 10:
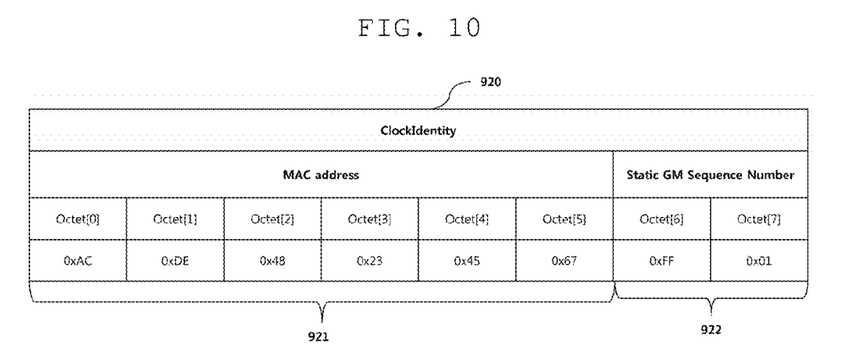
FIG. 10 is a view illustrating the format of a ClockIdentity field in accordance with one embodiment of the present invention.

FIG. 10 is a view illustrating the format of a ClockIdentity field in accordance with one embodiment of the present invention.

With reference to FIG. 10, the ClockIdentity field 920 includes a MAC address field 921 of 6 upper bytes and a Static GrandMaster Sequence Number field 922 of 2 lower bytes. Here, the Static GrandMaster Sequence Number field 922 may be used as an index to determine grandmaster selection priority in grandmaster reselection. For example, among normally operated nodes in which values are allocated to the Static GrandMaster Sequence Number fields 922, a node having the smallest value of the Static GrandMaster Sequence Number field 922 may be selected as a new grandmaster during a grandmaster reselection process.

For example, differently from the conventional method based on IEEE 802.1AS, the method of the present invention may use the same time source and thus select a new grandmaster using the Static GrandMaster Sequence Number field 922 of the ClockIdentity field 920 rather than other fields, thus shortening a time taken for grandmaster reconfiguration.

Figure 11:
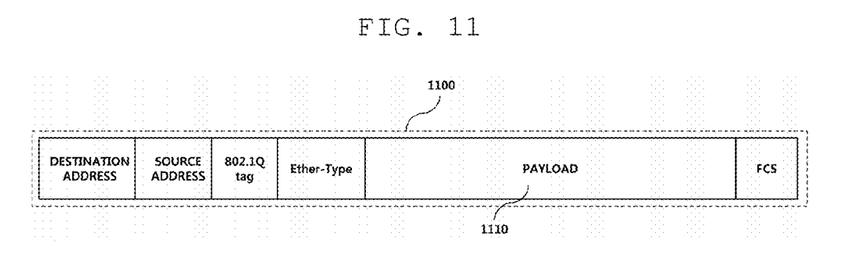
FIG. 11 is a view illustrating the structure of an AVB Ethernet message (frame) in accordance with one embodiment of the present invention.

FIG. 11 is a view illustrating the structure of an AVB Ethernet message (frame) in accordance with one embodiment of the present invention.

With reference to FIG. 11, an AVB Ethernet frame 1100 includes a destination address field, a source address field, an 802.1Q tag field, an Ethernet-type (Ether-Type) field, a payload field, and a frame check sequence (FCS) field. Here, the static announcement message 900 in accordance with the present invention is transmitted under the condition that it is inserted into the payload field 1110.

Figure 12:
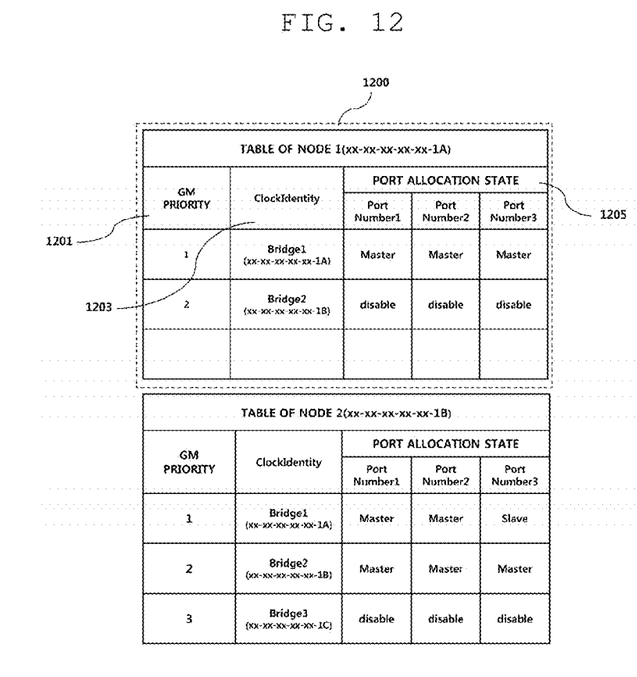
FIG. 12 is a view illustrating a static grandmaster table in accordance with one embodiment of the present invention.

FIG. 12 is a view illustrating a static grandmaster table in accordance with one embodiment of the present invention.

With reference to FIG. 12, a static grandmaster table 1200 may be generated by each node and maintained, when an initial time synchronization procedure is performed in an AVB Ethernet communication network using the same time source, and include grandmaster priority information 1201, ClockIdentity information 1203, and port allocation state information 1205 of the corresponding node and adjacent nodes.

The grandmaster priority information 1201 may be determined by the value of the Static GrandMaster Sequence Number field 922 of the ClockIdentity field 1203 of the corresponding node.

The port allocation state information 1205 is information to identify roles allocated to ports of the corresponding node and may be classified into a master state, a slave state, and a disabled state. Here, a port in the master state is a port to transmit a synchronization message for time synchronization and a follow-up message to lower nodes. On the other hand, a port in the slave state is a port to receive a synchronization message and a follow-up message from an upper node. Finally, a port in the disabled state means a port which is not used any more due to an error of the corresponding node.

Figure 13:
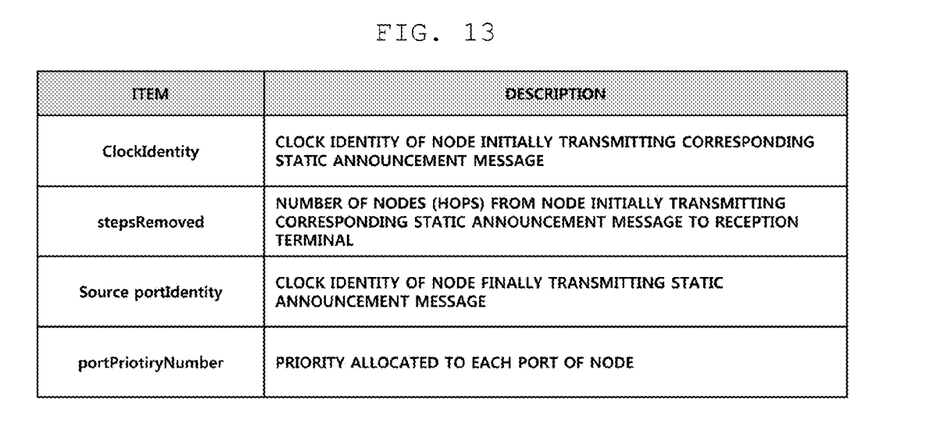
FIG. 13 is a table stating comparison parameters used to reselect a grandmaster when time synchronization in accordance with one embodiment of the present invention fails.

FIG. 13 is a table stating comparison parameters used to reselect a grandmaster when time synchronization in accordance with one embodiment of the present invention fails.

In more detail, comparison parameters used to reselect a grandmaster when time synchronization fails may include ClockIdentity, stepsRemoved, source portIdentity, and portPriorityNumber.

With reference to FIG. 13, when a grandmaster is absent, each node may extract the values of ClockIdentity fields 920 of static announcement messages 900 received from adjacent nodes and select a node having the smallest value of the Static GrandMaster Sequence Number field 922 as a grandmaster by comparing the values of the Static GrandMaster Sequence Number fields 922 of the extracted ClockIdentity fields 920.

Further, when a grandmaster is absent, each node judges whether or not the values of the ClockIdentity fields 920 of static announcement messages 900 received through its own slave ports are the same. Here, the fact that the values of the ClockIdentity fields 920 are the same may mean that nodes initially transmitting the static announcement messages 900 are the same. For example, an announcement message 900 transmitted by a node A may be received by different ports of a node B through different paths. In this case, the values of the ClockIdentity fields 920 of the received static announcement messages 900 may be the same.

If the values of the ClockIdentity fields 920 are the same, the corresponding node compares the values of the stepsRemoved fields 930 of the static announcement messages 900. Here, a value of the stepsRemoved field 930 means the number of nodes via which the static announcement message 900 initially transmitted from a node is received by a reception node. That is, as the value of the stepsRemoved field 930 decreases, the number of nodes through which the corresponding static announcement message 900 passes decreases. The port having received the static announcement message 900 having the smallest value of the stepsRemoved field 930 may be set to a master port to receive a synchronization message.

If the values of the stepsRemoved fields 930 of the received static announcement messages 900 are the same, the corresponding reception node compares the values of the ClockIdentity fields of the adjacent nodes having transmitted the static announcement messages 900.

Here, the ClockIdentity field of the adjacent node may have the same structure as the ClockIdentity field 920 shown in FIG. 10 and be recorded in the SourcePortIdentity field of the Header field 910 of the static announcement message 900.

Each node compares the values of the Static GrandMaster Sequence Number fields 922 of the ClockIdentity fields of the adjacent nodes and set a port thereof connected to the adjacent node having the smallest value of the Static GrandMaster Sequence Number field 922 to a slave port. Of course, if an adjacent lower node is present, remaining ports of the corresponding node may be set to master ports.

If the values of the Static GrandMaster Sequence Number fields 922 of the adjacent nodes are the same, among the ports of the corresponding node, a port having the highest priority may be set to a slave port for message reception. For this purpose, priorities may be allocated to the ports of the node in advance.

In accordance with another embodiment of the present invention, a static announcement message 900 may include information regarding the number of ports of a corresponding node. In this case, only if a node has two or more ports, the corresponding node may be recognized as a grandmaster candidate. A node having one port may be recognized as an end node and a port connected to an end node may be set as a master port.

Figure 14:
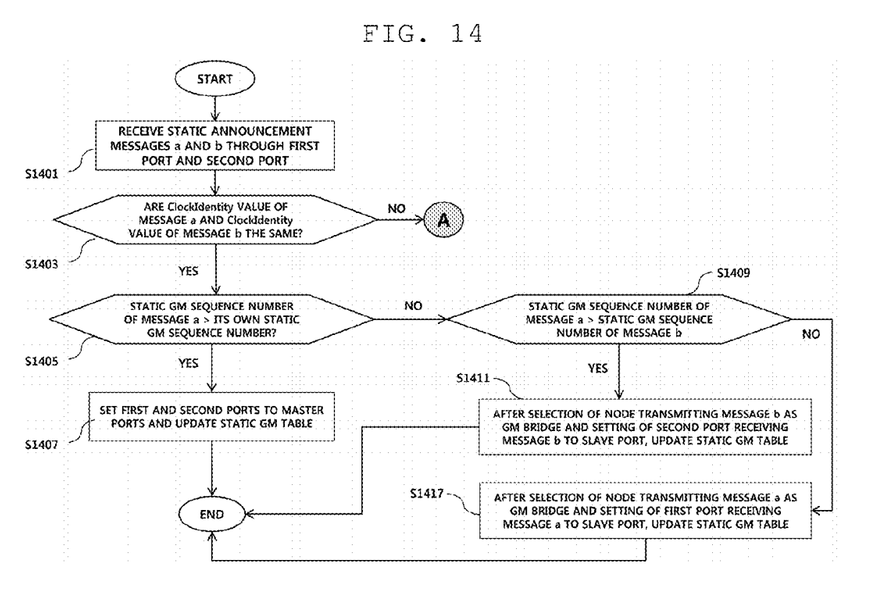
FIGS. 14 and 15 are flowcharts illustrating a method for allocating roles to ports using static announcement messages in accordance with one embodiment of the present invention.
Figure 15:
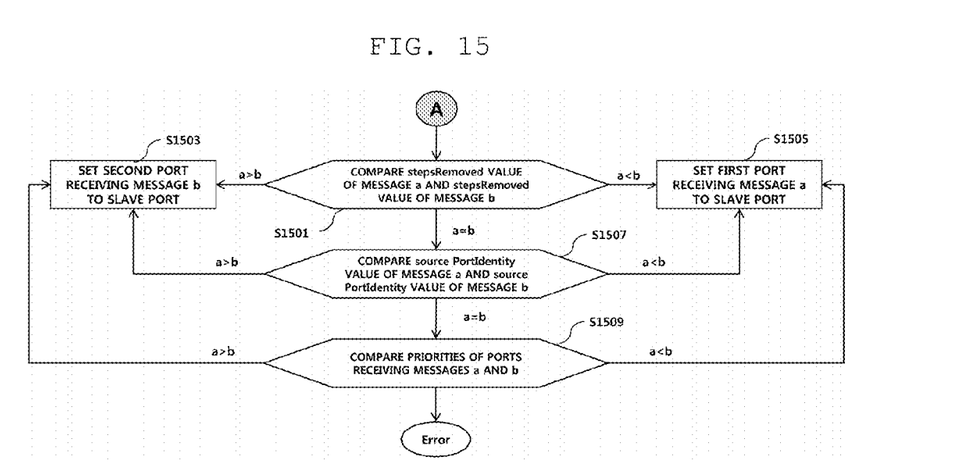

FIGS. 14 and 15 are flowcharts illustrating a method for allocating roles to ports using static announcement messages in accordance with one embodiment of the present invention.

Hereinafter, with reference to FIGS. 14 and 15, a method for allocating roles to ports using static announcement messages received by a node which is not a grandmaster now, i.e., referred to as a bridge for convenience of description, will be described in detail.

When a bridge receives static announcement messages a and b through its own first port and second port, the bridge compares whether the value of the ClockIdentity field of the static announcement message a with the value of the ClockIdentity field of the static announcement message b are the same (Operations S 1401 and 1403). As a result of comparison, if the two values are the same, a procedure shown by a connection mark A is performed. The procedure A will be described later with reference to FIG. 15.

As a result of comparison, if the value of the ClockIdentity field of the static announcement message a and the value of the ClockIdentity field of the static announcement message b are not the same, the bridge determines whether or not the value of the static GM sequence number field of the static announcement message a is greater than the value of the static GM sequence number field allocated to the bridge (Operation S1405).

As a result of judgment, if the value of the static GM sequence number field of the static announcement message a is greater than the value of the static GM sequence number field allocated to the bridge, the first port and the second port are set to master ports and a static GM table of the bridge is updated (Operation S1407).

If the value of the static GM sequence number field of the static announcement message a is not greater than the value of the static GM sequence number field allocated to the bridge in Operation S1405, the bridge judges whether or not the value of the static GM sequence number field of the static announcement message a is greater than the value of the static GM sequence number field of the static announcement message b (Operation S1409).

As a result of judgment, if the value of the static GM sequence number field of the static announcement message a is greater than the value of the static GM sequence number field of the static announcement message b, after the node having transmitted the static announcement message b is set to a GM bridge and the second port having received the static announcement message b is set to a slave port, the static GM table is updated (Operation S1411). On the other hand, if the value of the static GM sequence number field of the static announcement message a is not greater than the value of the static GM sequence number field of the static announcement message b, after the node having transmitted the static announcement message a is set to a GM bridge and the first port having received the static announcement message a is set to a slave port, the static GM table is updated (Operation S1417). Here, it may be understood that the GM bridge is an adjacent node to transmit a synchronization message generated by a grandmaster to the corresponding bridge.

Although the above description states a method for allocating roles to ports by comparing static announcement messages received through two ports, this method is only one embodiment and roles may be allocated to a larger number of ports using static announcement messages received through the ports in a similar method.

With reference to FIG. 15, if the two values of the ClockIdentity fields of the static announcement messages a and b are the same, as a result of comparison in Operation S1403 of FIG. 14, the bridge compares the values of the stepsRemoved fields of the static announcement messages a and b (Operation S1501).

If the value of the stepsRemoved field of the static announcement message a is greater than the value of the stepsRemoved field of the static announcement message b, the second port having received the static announcement message b is set to a slave port (Operation S1503). On the other hand, if the value of the stepsRemoved field of the static announcement message b is greater than the value of the stepsRemoved field of the static announcement message a, the first port having received the static announcement message a is set to a slave port (Operation S1505).

If the value of the stepsRemoved field of the static announcement message a and the value of the stepsRemoved field of the static announcement message b are the same, the bridge compares the values of the source PortIdentity fields of the static announcement messages a and b (Operation S1507). The source PortIdentity field is included in the header field of the static announcement message. Here, the source PortIdentity field may be a field indicating ClockIdentity of an adjacent node, i.e., a node finally transmitting the static announcement message a or b, and the bridge may compare the values of the static GM sequence number fields included in the ClockIdentity fields of the adjacent nodes included in the static announcement messages a and b, hereinafter, simply named adjacent node static GM sequence numbers.

As a result of Operation S1507, if the adjacent node static GM sequence number corresponding to the static announcement message a is greater than the adjacent node static GM sequence number corresponding to the static announcement message b, the bridge performs Operation S1503. On the other hand, if the adjacent node static GM sequence number corresponding to the static announcement message b is greater than the adjacent node static GM sequence number corresponding to the static announcement message a, the bridge performs Operation S1505.

If the adjacent node static GM sequence number corresponding to the static announcement message a and the adjacent node static GM sequence number corresponding to the static announcement message b are the same, the bridge compares priorities of the ports having received the static announcement messages a and b (Operation S1509).

As a result of comparison, if priority of the first port is higher than priority of the second port, the bridge performs Operation S1503 and, if priority of the second port is higher than priority of the first port, the bridge performs Operation S1505. If the priorities of the two ports are the same, the bridge is in an error state. The error state may be caused by a defect of equipment or a fault message.

Figure 16:
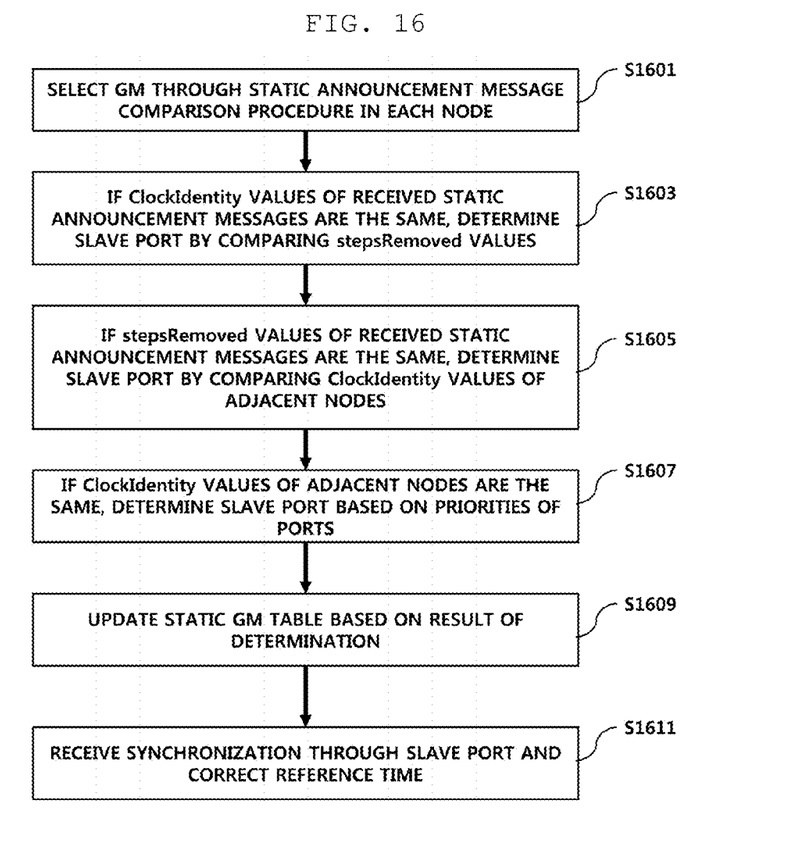
FIG. 16 is a flowchart illustrating a procedure for reselecting a grandmaster using static announcement messages in accordance with another embodiment of the present invention.

FIG. 16 is a flowchart illustrating a procedure for reselecting a grandmaster using static announcement messages in accordance with another embodiment of the present invention.

First, when absence of a grandmaster is confirmed, each of respective nodes having the same time source on an AVB Ethernet communication network may select a grandmaster using a static grandmaster table, which is constituted in advance, and through a received static announcement message comparison procedure (Operation S1601).

Thereafter, each node may perform a GM bridge selection procedure.

The GM bridge selection procedure may include Operation S1603 in which, if the values of ClockIdentity fields of received static announcement messages are the same, a slave port is determined by comparing the values of stepsRemoved fields of the received static announcement messages, Operation S1605 in which the values of stepsRemoved fields of the received static announcement messages are the same, the slave port is determined by comparing ClockIdentity values of adjacent nodes, and Operation S1607 in which, if the ClockIdentity values of the adjacent nodes are the same, the slave port is determined based on priorities of ports of the node.

Thereafter, each node may update the grandmaster table based on the GM bridge selection procedure and correct its own inner reference time using a synchronization message received through the determined slave port (Operation S1609 and S1611).

Figure 17:
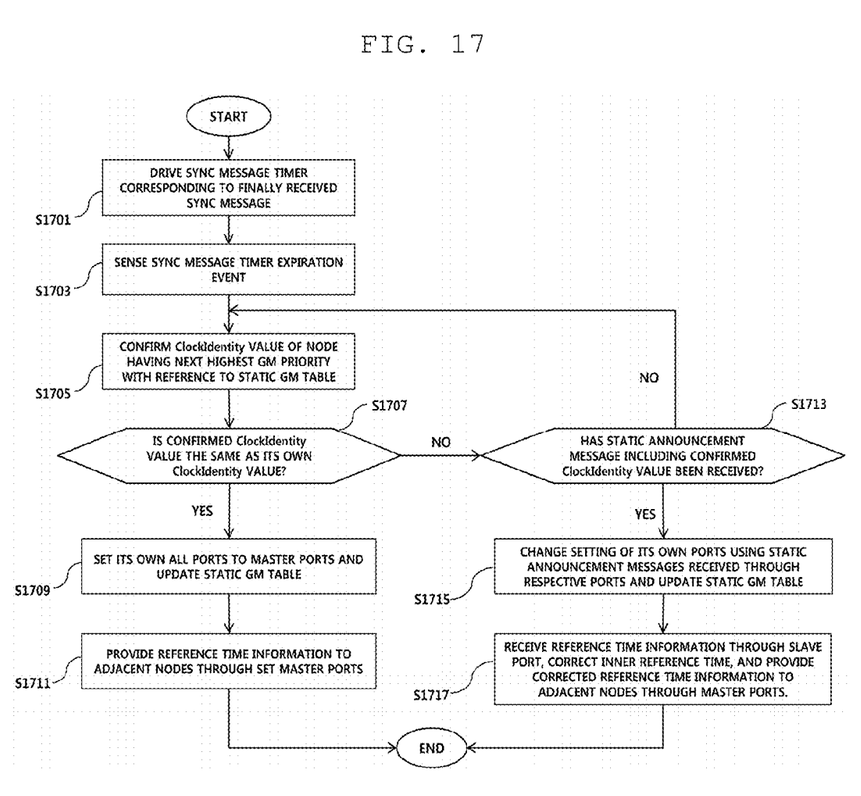
FIG. 17 is a flowchart illustrating a procedure for reselecting a grandmaster using static announcement messages in accordance with yet another embodiment of the present invention.

FIG. 17 is a flowchart illustrating a procedure for reselecting a grandmaster using static announcement messages in accordance with yet another embodiment of the present invention.

With reference to FIG. 17, a bridge drives a synchronization message timer corresponding to a finally received synchronization message (Operation S1701).

When the bridge senses a designated event signal indicating expiration of the driven synchronization message timer, the bridge confirms the ClockIdentity value of a node having next GM priority with reference to a static GM table (Operation S1703 and S1705).

Thereafter, the bridge compares the confirmed ClockIdentity value with its own ClockIdentity value (Operation S1707).

As a result of comparison, if the confirmed ClockIdentity value and the ClockIdentity value of the bridge are the same, the bridge sets all ports thereof to master ports and updates the static GM table (Operation S1709).

Thereafter, the bridge is operated as a grandmaster and transmits a synchronization message and a follow-up message through the set master ports, thus providing reference time information to adjacent nodes (Operation S1711).

As a result of comparison in Operation S1707, if the confirmed ClockIdentity value and the ClockIdentity value of the bridge are not the same, the bridge confirms whether or not a static announcement message including the confirmed ClockIdentity value has been received (Operation S1713).

As a result of confirmation, if the static announcement message including the confirmed ClockIdentity value has not been received, the bridge performs Operation 1705.

On the other hand, if the static announcement message including the confirmed ClockIdentity value has been received, the bridge changes setting of the ports thereof using static announcement messages received through the respective ports thereof and updates the static GM table (Operation S1715).

Thereafter, the bridge receives reference time information thorough a slave port thereof, corrects its own inner reference time, and provides the corrected reference time information to the adjacent nodes through master ports thereof (Operation S1717).

As apparent from the above description, a method and apparatus in accordance with the present invention will have effects, as follows.

First, the present invention provides a method and apparatus for providing time synchronization in an in-vehicle Ethernet communication network.

Second, the present invention provides a method and apparatus for providing time synchronization in an in-vehicle Ethernet communication network in which time synchronization may be rapidly acquired using a static grandmaster table in an Audio Video Bridging (AVB) Ethernet communication network.

Third, the present invention provides a method and apparatus for providing time synchronization in an in-vehicle Ethernet communication network in which a static grandmaster table may be constituted when an initial time synchronization procedure between a bridge and terminals having the same time source is performed, and a new grandmaster may be rapidly selected using the constituted static grandmaster table when the grandmaster is absent.

Fourth, the present invention provides a method and apparatus for providing time synchronization in an in-vehicle Ethernet communication network in which, when a grandmaster is reselected, a time taken for traffic and time synchronization on an Ethernet network may be minimized.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for providing time synchronization in a node connected to an Audio Video Bridging (AVB) Ethernet communication network, the method comprising steps of:
receiving static announcement messages from adjacent nodes and constituting a static grandmaster table;
reselecting a grandmaster with reference to the static grandmaster table when a synchronization message timer expires;
updating the static grandmaster table according to the reselection of the grandmaster; and
selecting a grandmaster bridge using the static announcement messages received from the adjacent nodes when the new grandmaster is reselected,
wherein when the grandmaster bridge is selected, roles of ports of the node are set according to a result of the selection of the grandmaster bridge, and port allocation state information of the static grandmaster table is updated based on the set roles of the ports.

2. The method according to claim 1, wherein the static announcement message includes clock identity information corresponding to a node initially generating the static announcement message, and the step of reselecting the grandmaster is based on a static grandmaster sequence number included in the clock identity information.

3. The method according to claim 1, wherein the static grandmaster table includes grandmaster priority information, clock identity information and the port allocation state information associated with the nodes.

4. The method according to claim 3, wherein, when the synchronization message timer expires, a node having the highest grandmaster priority after a node set to the current grandmaster is reselected as a new grandmaster.

5. The method according to claim 4, wherein the static grandmaster table is updated so that all ports of the node reselected as the new grandmaster are set to master ports.

6. The method according to claim 1, wherein the step of reselecting the grandmaster includes comparing stepsRemoved values of the static announcement messages received from the adjacent nodes,
wherein an adjacent node having the smallest stepsRemoved value is selected as the grandmaster bridge and the port of the node corresponding to the adjacent node selected as the grandmaster bridge is set to a slave port.

7. The method according to claim 6, further comprising, if the stepsRemoved values of the static announcement messages received from the adjacent nodes are the same, comparing clock identity values of the static announcement messages corresponding to the adjacent nodes,
wherein the grandmaster bridge is determined based on static grandmaster sequence numbers of the clock identity values corresponding to the adjacent nodes.

8. The method according to claim 7, wherein the clock identity values corresponding to the adjacent nodes are recorded in sourcePortIdentity fields of header fields of the static announcement messages.

9. The method according to claim 7, further comprising, if the static grandmaster sequence numbers of the clock identity values corresponding to the adjacent nodes are the same, comparing priorities of ports of the node receiving the static announcement messages,
wherein an adjacent node connected to the port of the node having the highest priority is determined as the grandmaster bridge.

10. The method according to claim 1, wherein the node connected to the AVB Ethernet communication network uses the same time source as a time source used by another node connected to the AVB Ethernet communication network.

11. The method according to claim 1, wherein the static announcement message is transmitted under a condition that it is inserted into a payload region of an AVB Ethernet frame.

12. The method according to claim 1, wherein, when expiration of the synchronization message timer is sensed, the port allocation state information of the static grandmaster table is updated so that all ports of a node set to the current grandmaster are switched to a disabled state.

13. A non-transitory computer readable recording medium having a program recorded therein to implement the method according to claim 1.

14. An apparatus for providing time synchronization to a node connected to an Audio Video Bridging (AVB) Ethernet communication network, the apparatus comprising:
a clock slave port configured to receive static announcement messages from adjacent nodes and to constitute a static grandmaster table; and
a bridge configured to reselect a grandmaster with reference to the static grandmaster table when a synchronization message timer expires, to update the static grandmaster table according to the reselection of the grandmaster, and to select a grandmaster bridge using the static announcement messages received from the adjacent nodes when the new grandmaster is reselected,
wherein the bridge set roles of ports of the node according to a result of the selection of the grandmaster bridge and a port allocation state information of the static grandmaster table updates based on the set roles of the ports.

15. The apparatus according to claim 14, wherein the static announcement message includes clock identity information corresponding to a node initially generating the static announcement message, and the grandmaster is reselected based on a static grandmaster sequence number included in the clock identity information.

16. The apparatus according to claim 14, wherein the static grandmaster table includes grandmaster priority information, clock identity information and the port allocation state information associated with the nodes.

17. The apparatus according to claim 16, wherein, when the synchronization message timer expires, a node having the highest grandmaster priority after a node set to the current grandmaster is reselected as a new grandmaster.

18. The apparatus according to claim 17, wherein the static grandmaster table is updated so that all ports of the node reselected as the new grandmaster are set to master ports.

19. The apparatus according to claim 14, wherein stepsRemoved values of the static announcement messages received from the adjacent nodes are compared,
wherein an adjacent node having the smallest stepsRemoved value is selected as the grandmaster bridge and the port of the node corresponding to the adjacent node selected as the grandmaster bridge is set to a slave port.

20. The apparatus according to claim 19, wherein, if the stepsRemoved values of the static announcement messages received from the adjacent nodes are the same, clock identity values of the static announcement messages corresponding to the adjacent nodes are compared,
wherein the grandmaster bridge is determined based on static grandmaster sequence numbers of the clock identity values corresponding to the adjacent nodes.

21. The apparatus according to claim 20, wherein the clock identity values corresponding to the adjacent nodes are recorded in sourcePortIdentity fields of header fields of the static announcement messages.

22. The apparatus according to claim 20, wherein, if the static grandmaster sequence numbers of the clock identity values corresponding to the adjacent nodes are the same, priorities of ports of the node receiving the static announcement messages are compared,
wherein an adjacent node connected to the port of the node having the highest priority is determined as the grandmaster bridge.

23. The apparatus according to claim 14, wherein the node connected to the AVB Ethernet communication network uses the same time source as a time source used by another node connected to the AVB Ethernet communication network.

24. The apparatus according to claim 14, wherein the static announcement message is transmitted under a condition that it is inserted into a payload region of an AVB Ethernet frame.

25. The apparatus according to claim 14, wherein, when expiration of the synchronization message timer is sensed, the port allocation state information of the static grandmaster table is updated so that all ports of a node set to the current grandmaster are switched to a disabled state.

\* \* \* \* \*